3,788,947
MICROBIOLOGICAL REDUCTION OF 10(11) UNSATURATED PROSTAGLANDINS
Charles F. Hsu, Skokie, and James Jiu and Seth Setsuo Mizuba, Morton Grove, Ill., assignors to G. D. Searle & Co., Chicago, Ill.
No Drawing. Filed Oct. 5, 1972, Ser. No. 295,209
Int. Cl. C12d 1/02
U.S. Cl. 195—51 R          28 Claims

ABSTRACT OF THE DISCLOSURE

The present invention relates to fermentative reduction of the 10(11) double bond of PGA-type prostaglandins. More particularly, the invention provides a process for selective 10(11) double bond reduction of $PGA_2$ by fungi of genera Cunninghamella, Mucor, Polyporus, Sphaeropsis, Stemphylium, Cladosporium, Hormodendrum, Epicoccum, Fusarium, Gliocladium, Dactylium, Cephalosporium, Aspergillus, and Penicillium. The same transformation is accomplished by bacteria of genera Bacillus, Enterobacter, Escherichia, and Proteus.

---

The present invention relates to selective microbiological reduction of the 10(11) carbon to carbon double bond of prostenoic acids of the PGA type. The selective 10(11) reduction is accomplished by a large variety of fungi and bacteria under variable fermentation conditions. A few organisms preform other useful transformation in addition to 10(11) double bond reduction. The products of the present invention have utility as anti-ulcerogenic and anti diuretic agents.

The generic transformation is shown in Scheme I to be the reduction of the 10(11) double bond. This process under appropriate conditions and in the presence of an

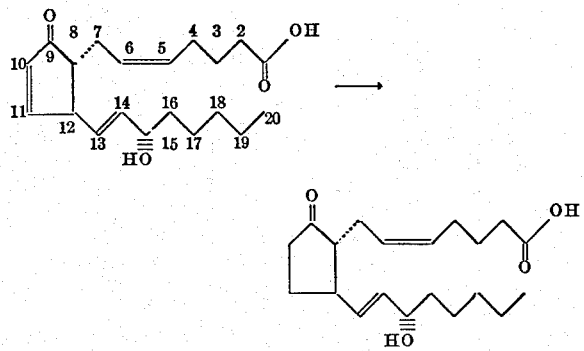

Scheme I appropriate microorganism is selective and reduction of the 10(11) double bond is the only observed transformation. Other microorganisms and conditions lead to other molecular transformation in addition to 10(11) double bond reduction. Reduction of the 13(14) double bond, oxidation of the 15-hydroxy to 15-oxo, and 18-hydroxylation are among the other concommitant transformations which are achieved in this invention.

Chemical synthesis of 10(11) dihydro $PGA_2$, 15(S)-hydroxy-9-oxo-5-cis-13-trans-prostadienoic acid, is described in Belgium Pat. 766,521. This is a low yield multistep synthesis.

Reduction of the 10(11) double bond is evidently an initial step in fungal and bacterial metabolism of PGA type prostaglandins such as $PGA_2$. This reduction is selectively performed by fungi of the following genera:

Mucor
Crepidotus
Polyporus
Sphaeropois
Stemphylium
Cladosporium
Hormodendrum
Epicoccum
Fusarium
Gliocladium
Cephalosporium
Aspergillus
Penicillium and bacteria of the following genera:

Bacillus
Enterobacter
Escherichia
Proteus

The specific organisms which perform the selective 10(11) double bond reduction are:

FUNGI

Mucor sp. (NRRL[1] 5607)
Crepidotus sp. (NRRL 5601)
*Polyporus versicolor* (NRRL 5610)
Sphaeropsis sp. (NRRL 5611)
Stemphylium sp. (NRRL 5612, NRRL 5613)
Cladosporium sp. (NRRL 5600)
Hormodendrum sp. (NRRL 5606)
Epicoccum sp. (NRRL 5602)
Fusarium sp. (NRRL 5603)
Gliocladium sp. (NRRL 5605)
Cephalosporium sp. (NRRL 5499)
Aspergillus sp. (NRRL 5497)
*Aspergillus niger* (ATCC 9642)
*Aspergillus niger* (NRRL 330)
*Aspergillus flavus* (NRRL 482)
*Aspergillus tamarii* (NRRL 5498)
*Aspergillus oryzae* (NRRL 5496)
*Aspergillus albicans* (NRRL 5495)
Penicillium sp. (NRRL 5608, NRRL 5609)

BACTERIA

*Bacillus polymyxa* (ATCC 12321)
*Enterobacter aerogenes* (ATCC 13049, ATCC 129)
*Escherichia coli* (ATCC 4352)
*Proteus vulgaria* (ATCC 13315)

The prostaglandin substrate is added to a suitable growth (usually 36 hours) of one of the above mentioned fungi or bacteria and the broth is further fermented for an appropriate period of time (usually 24 hours). The bacterial fermentations are conducted in a nitrogen atmosphere.

*Dactylium dendroides* (NRRL 2575) alters metabolic product distribution in regard to transformations occurring in addition to 10(11) double bond reduction as a ---
[1] NRRL cultures can be obtained at A.R.S. Culture Collection, 1815 North University Street, Peoria, Ill. 61604. ATCC cultures can be obtained at American Type Culture Collection, 12301 Parklawn Drive, Mockville, Md. 20852.

function of incubation time prior to introduction of the substrate. Scheme II shows the different product distribution upon adding $PGA_2$ to a 48 hour growth and a 168 hour growth of *Dactylium dendroides* (NRRL 2575).

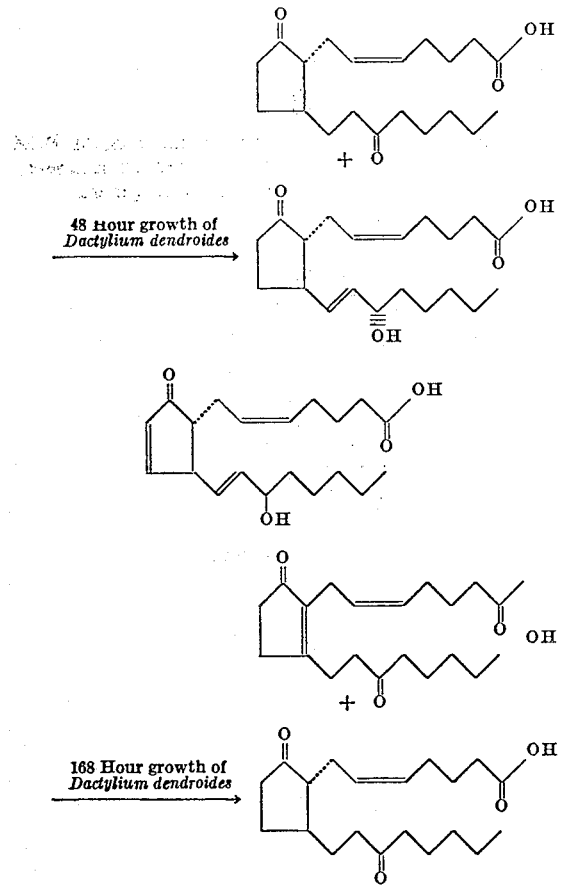

*Cunninghamella blakesleeana* (ATCC 9245) performs an 18-hydroxylation in addition to 10(11) double bond reduction of $PGA_2$.

Products of the present invention 15(S)-hydroxy-9-oxo-5 - cis - 13-trans-prostadienoic acid and 9,15-dioxo-5-cis-prostenoic acid have utility as anti-ulcerogenic and anti-ADH (anti-diuretic hormone) agents. Belgium Pat. 766,521 discloses utility of 15(S)-hydroxy-9-oxo-5-cis-13-trans-prostadienoic acid in the treatment of hypertension, atherosclerosis, and circulatory disorders.

The anti-ulcerogenic utility of the instant compounds is evident from the results of a standardized test for their capacity to inhibit the ulceration reported by Shay et al., Gasteroenterology, 5, 43 (1945), to occur in rats subjected to fasting and pyloric ligation. In this test, male Charles River rats weighing 200–250 gm. and fasted 72 hours prior to ligation are used. Immediately following ligation, the prescribed dose of compound, dissolved or suspended in 1.0 ml. of pH 2.0 hydrochloric acid, is intragastrically administered to each of a group of 6 animals. A like group of animals to which is identically and concurrently administered the acid alone serves as controls. Precisely 19 hours later, the stomachs of surviving animals are excised and examined under 5× magnification. The number of ulcers occurring in the non-secretory portion of each stomach is counted in 4 groups according to size (<2 mm., 2–4 mm., 4–8 mm., and >8 mm.); and each rat receives a score, z which is a weighted average of the logarithms of the ulcer counts in the several size groups determined by a formula found approximately optimal by discriminant function analysis to be $z + 20.00 \log (N_1+1) + 0.22 \log N_2+1)$
$+ 46.76 \log (N_3+1) + 6.11 \log (N_4+1)$ where $N_1 \ldots N_4$ are the observed ulcer counts of the increasing size groups. Since long-term studies in approximately 400 animals show that the average $z$ value for controls is 96.2, with a standard error per group of 6 equal to 18.97, a decrease in the average $z$ score for a given test group, relative to concurrent controls, amounting to 37.5 or more is significant ($P<0.05$) and a compound producing such a decrease is considered anti-ulcerogenic.

The anti-ADH activity of the instant compounds is assessed by the ability of these compounds to reverse oliguria induced by exogenous ADH.

Male Badger rats (Badger Research Corp., Madison, Wis.) weighing 150–175 g. were maintained at 70–73° F. During the first week the animals were conditioned once to (a) bladder palpation, (b) gastric intubation with a French No. 8 catheter followed by tap water (5 ml./100 g.) and (c) 0.5 ml. of 0.9% NaCl, sq. On the 7th or 8th day after arrival the first experiment (week I) was performed: 18 hours prior to the test the rats were deprived of food, but allowed water ad libitum. The following day the animals (ca. 180 g./rat, range 160–200 g.) were placed in groups of 4 with no more than a 2% variation in group mean weights about the grand mean. At 0 time following bladder palpation the animals were (a) loaded orally with 0.21% NaCl (5 ml./100 g.) containing 5% ethanol (v./v.) and 5% propylene glycol (v./v.), together with dissolved or suspended test compound, and (b) 1 milliunit (mU) of Pitressin (Parke, Davis & Co.,) per 100 g. in 0.2 ml. of 0.9% NaCl, sq. (neck). Sixty minutes later the animals were palpated, urine volume measured, and a second gavage (5 ml./100 g. of 2.5% ethanol in 0.20% NaCl) and a repeated dose of ADH administered. After 2 hours the test was terminated by palpation to insure complete recovery of a pooled urine sample. Urine volume and Na and K excretion were reported in ml./100 g./2 hours and μeq./100 g./2 hours, respectively. The animals were regrouped and retested 1 week later (week II, ca. 200 g./rat, range 170–210 g.). In most experiments 2 groups (8 rats) were tested at each dosage level.

The appropriate volume metameter for statistical evaluations of response was taken to be log volume. On the log volume scale, 50% reversal of the response to 1 mU ADH/100 g. was the midpoint between 1 mU and control log volume responses. (This point if equivalent to the geometric mean of the two extreme volume responses.) For a test compound, $ED_{50}$ was defined as the dose necessary to produce 50% reversal, as defined above, when given together with 1 mU ADH/100 g. The 95% confidence limits of the $ED_{50}$ were calculated according to Fieller's theorem on the fiducial limits of a ratio.

Fermentation is ordinarily carried out in the medium wherein the organism is cultured. However, it is likewise possible to separate the bacterial cells from the culture medium by centrifugation or other means and use the resultant cellular matter to implement the fermentation. Moreover, the cells can be ruptured ultrasonically or otherwise to facilitate access to enzymes present, which can be isolated by filtration or extracted with a solvent such as acetone or water and substituted for the organism or cells thereof.

A nutrient medium is required for culture of the organism, which is to say one containing assimiable nitrogen and carbon; and an adequate supply of sterile air should be maintained therein, for example, by exposing a large surface of the medium to the air or preferably passing it through the medium in quantities sufficient to support submerged growth.

Suitable nitrogen sources are thus normally employed for the purpose, including soy bean meal, cornsteep liquor, meat extract, protein (optionally digested), peptone, yeast extract, distillers' solubles, casein hydrolysate, nitrate, cottonseed meal and/or ammonium compounds. All of the foregoing materials excepting sometimes the last two serve also as carbon sources. Other carbon-containing substances satisfactory and conventionally used as nutrients are the carbohydrates, for example, glycerol, glucose, fructose, sucrose, lactose, maltose, inositol, dextrin, starch and whey, among which inositol is additionally useful because of its unusual capacity to stimulate growth.

Phosphate, magnesium, and/or ferrous ions likewise may be incorporated in the culture medium as growth-promoting factors if desired; buffers may be added to assure that growth is initiated at a suitable pH; and wetting agents may be employed to improve contact between the prostaglandin and the fermenting agent. An anti-foaming agent is usually beneficial. Where isolated cells or enzymes are used to induce fermentation rather than the intact and growing organism, nutrients need not, of course be present; but in either event the medium is customarily preponderantly aqueous.

A preferred embodiment of the fungal fermentation process which leads to selective reduction is conducted in a medium consisting of 150 parts of cottonseed meal, 0.3 part by volume of 6 N HCl, and 1000 parts by volume of water. The medium is sterilized by heating for 1 hour at 121° C. whereupon it is cooled to 23° C. and then is inoculated with 10 parts of a fluid culture of Gliocladium sp. (NRRL 5605). The inoculating fluid culture is prepared by incubating a seed culture for 72 hours in 100 parts by volume of the above-mentioned sterilized medium from spores originating on an agar slant. The inoculated medium is incubated for 36 hours with vigorous agitation and then 0.1 part of 15(S)-hydroxy-9-oxo-5-cis-10,13-trans-prostatrienoic acid (PGA$_2$), which is dissolved in 10 parts by volume of acetone, is introduced to the growing culture of Gliocladium sp. (NRRL 5605). The microbial broth containing the 15(S)-hydroxy-9-oxo-5-cis-10,13-trans-prostatrienoic acid is incubated for an additional 24 hours at 23° C. with vigorous agitation. Following incubation, the mixture is extracted with dichloromethane and the product is isolated by silica gel chromatography.

When the fungus, *Dactylium dendroides* (NRRL 2575), is incubated in the above medium for 48 hours prior to the addition of 0.1 part of 15(S)-hydroxy-9-oxo-5-cis-10,13-trans-prostatrienoic acid (PGA$_2$), the products are 5,9-dioxo-5-cis-prostenoic acid and 15(S)-hydroxy-9-oxo-5-cis-13-trans-prostadienoic acid. If the identical fermentation is allowed to continue for 168 hours prior to the addition of PGA$_2$, the products are 9,15-dioxo-5-cis-prostenoic acid and 9,15-dioxo-5-cis-8(12)-prostadienoic acid. In both of the latter fermentations the products are isolated by silica gel chromatography. A preferred embodiment of the bacterial fermentation process which leads to selective reduction is conducted in a medium consisting of 3 parts of beef extract, 5 parts of peptone, and 1000 parts by volume of tap water. The medium is sterilized by heating for 1 hour at 121° C., whereupon it is cooled to 23° C. and then it is inoculated with 10 parts by volume of a fluid culture of *Bacillus polymyxa* (ATCC 12321). The inoculating fluid culture is prepared by incubation of a seed culture in 1000 parts by volume of the above-mentioned sterilized medium from cells originating on an agar slant. The seed culture and subsequent incubations of this bacterium are conducted in a nitrogen atmosphere. The inoculated medium is incubated for 36 hours with vigorous agitation and then 0.1 part of 15(S)-hydroxy-9-oxo-5-cis-10,13-trans-prostatrienoic acid, which is dissolved in 10 parts by volume acetone, is introduced to the culture of growing bacteria. The microbial growth containing the 15(S)-hydroxy - 9 - oxo-5-cis-10,13-trans-prostatrienoic acid is incubated for an additional 36 hours. Following incubation, the mixture is extracted with dichloromethane and the product is isolated by silica gel chromatography. It is obvious to one skilled in chromatographic arts, that a large number of separation techniques are available for isolation and purification of the fermentation products. There hereinafter set forth examples describe a preferred and practical separation procedure.

The following examples are presented to further illustrate the present invention. They should not be construed as limiting it either in scope or in spirit. In these examples quantities are indicated in parts by weight unless parts by volume are specified, and temperatures are indicated in degrees centigrade (° C.).

Example 1

A medium consisting of 150 parts of cottonseed meal, 65 parts by volume of cornsteep liquor, 50 parts of dextrose, 0.3 part by volume of 6 N hydrochloric acid, and 1000 parts by volume of water is sterilized by heating for 1 hour at 121°, whereupon it is cooled to 23±1° and then is inoculated with 10 parts of a fluid culture of Gliocladium sp. (NRRL 5605). The inoculating fluid is prepared by incubating a seed culture for 72 hours in 100 parts by volume of the above mentioned sterilized medium from spores originating on an agar slant.

The inoculated medium is incubated for 36 hours with vigorous agitation and then 0.1 part of 15(S)-hydroxy-9-oxo-5-cis-10,13-trans-prostatrienoic acid (PGA$_2$) which is dissolved in 10 parts by volume of acetone is introduced to the culture of growing microbes. The microbial broth containing the prostatrienoic acid is incubated for an additional 24 hours at 23° with vigorous agitation. Following incubation, the mixture is extracted with dichloromethane. The dichloromethane layer is separated and then the solvent is removed from this separated layer by evaporation in vacuo. The product is taken up in a solution consisting of 97 parts by volume of benzene, 2 parts by volume of dioxane and 1 part by volume of acetic acid and placed on a silica gel chromatography column. The column is developed by gradually increasing the proportions of dioxane and acetic acid and the product 15(S)-hydroxy - 9 - oxo-5-cis-13-trans-prostadienoic, acid is eluted in a solvent system consisting of 85 parts by volume of benzene, 10 parts by volume of dioxane, and 5 parts by volume of acetic acid.

Example 2

A medium consisting of 3 parts of beef extract, 5 parts of peptone, and 100 parts by volume of water is sterilized by heating for 1 hour at 121°, whereupon it is cooled to 23° and then is inoculated with 10 parts by volume of a fluid culture of *Bacillus polymyxa* (ATCC 12321). The inoculating fluid culture is prepared by incubation of a seed culture in 100 parts by volume of the above-mentioned sterilized medium form spore originating on an agar slant. The seed culture and subsequent incubations of this bacterium are conducted in a nitrogen atmosphere.

The inoculated medium is incubated for 36 hours with vigorous agitation and then 0.1 parts of 15(S)-hydroxy-9-oxo-5-cis - 10,13 - trans-prostatrienoic acid (PGA), which is dissolved in 10 parts by volume of acetone is introduced to the culture of growing microbes. The microbial growth containing the PGA$_2$ is incubated for an additional 24 hours at 23° with vigorous agitation. The mixture is then extracted with dichloromethane. The dichloromethane layer is separated and the solvent in the separated layer is removed by evaporation in vacuo. The product is taken up in a solution consisting of 97 parts by volume of benzene, 2 parts by volume of dioxane, and 1 part by volume of acetic acid. The column is developed by gradually increasing the proportions of dioxane and acetic acid and the product, 15(S)-hydroxy-9-oxo-5-cis-13-trans-prostadienoic acid, is eluted in a solvent system consisting of 85 parts by volume of benzene, 10 parts by volume of dioxane, and 5 parts by volume of acetic acid.

Example 3

Using the medium and inoculation procedure of Example 1, *Dactylium dendroides* (NRRL 2575) is incubated for 168 hours and then 0.1 parts of 15(S)-hydrox - 9 - oxo - 5 - cis - 10,13 - trans-prostatrienoic acid ($PGA_2$) is added. Incubation in the presence of the $PGA_2$ substrate is continued for 24 hours, at which time the mixture is extracted with dichloromethane. The dichloromethane layer is separated and the solvent is removed from this separated layer by evaporation in vacuo. The crude extract is taken up in 850 parts by volume of phosphate buffer solution of pH 8 and this solution is extracted with hexane. The aqueous layer is made acidic with 6 N hydrochloric acid and extracted with dichloromethane. The dichloromethane is removed by evaporation in vacuo. The remaining material is taken up in ethyl acetate and that which is insoluble in ethyl acetate is removed by filtration. The ethyl acetate is evaporated and the remaining material is taken up in a solution consisting of 97 parts by volume of benzene, 2 parts by volume of dioxane, and 1 part by volume of acetic acid. This solution is placed on a chromatographic column packed with silica gel and 9,15-dioxo-5-cis-prostenoic acid is eluted in a solvent system consisting of 92.4 parts by volume of benzene, 6.3 parts by volume of dioxane, and 1.4 parts by volume of acetic acid. 9,15 - dioxo - 5 - cis - 8(12)-prostadienoic acid is eluted in a solvent system consisting of 85 parts by volume of benzene, 10 parts by volume of dioxane, and 5 parts by volume of acetic acid.

Example 4

The procedure set out in Example 3 is followed with the exception that the *Dactylium dendroides* (NRRL 2575) is allowed to grow only for 48 hours before addition of 0.1 parts of 15(S) - hydroxy-9-oxo-5-cis-10,13-trans-prostenoic acid. The fermentation mixture is extracted and is prepared for column chromatography on silica gel also as described in Example 3. 9,15-dioxo-5-5-cis-prostenoic acid is eluted in a solvent system consisting of 91 parts by volume of benzene, 7 parts by volume of dioxane, and 2 parts by volume of acetic acid. 15(S)-hydroxy - 9 - oxo - 5 - cis - 13 - trans-prostadienoic acid is eluted in a solvent system consisting of 85 parts by volume of benzene, 10 parts by volume of dioxane, and 5 parts by volume of acetic acid.

Example 5

Using the procedures set out in Example 1, 0.1 parts of 15(S) - hydroxy - 9 - oxo - 5 - cis - 10,13 - trans-prostatrienoic acid ($PGA_2$) is added to a 36 hour culture of *Cunninghamella blakesleeana* (ATCC 9245) and the mixture is further cultivated for 24 hours. The fermentation mixture is prepared for chromatography as is described in Example 1 and placed on a silica gel packed column in a solution consisting of 97 parts by volume of benzene, 2 parts by volume of dioxane, and 1 part by volume of acetic acid. 15(S)-hydroxy-9-oxo-5-cis - 13 - trans-prostadienoic acid as eluted in a solvent system consisting of 87 parts by volume of benzene, 10 parts by volume of dioxane and 3 parts by volume of acetic acid and 15(S),18 - dihydroxy - 9 - oxo - 5 - cis - 13 - trans-prostadienoic acid is eluted in a solvent system consisting of 74 parts by volume of benzene, 18 parts by volume of dioxane, and 8 parts by volume of acetic acid.

Example 6

A culture of Mucor sp. (NRRL 5607) is grown, exactly as described in Example 1, in a sterilized medium consisting of 150 parts of cottonseed meal, 65 parts by volume of cornsteep liquor, 50 parts of dextrose, 0.3 parts by volume of 6 N HCl, and 1000 parts by volume of water. The inoculated medium is incubated for 36 hours with vigorous agitation and then 0.1 parts of 15(S)-hydroxy - 9 - oxo - 5 - cis - 10,13 - trans-prostatrienoic acid ($PGA_2$) in 10 parts by volume of acetone is introduced to the growing culture. Incubation is continued for an additional 24 hours an the product, 15(S)-hydroxy-9-oxo - 5 - cis - 13 - trans-prostadienoic acid, is isolated as described in Example 1.

Example 7

A culture of Crepidotus sp. (NRRL 5601) is grown, exactly as described in Example 1, in a sterilized medium consisting of 150 parts of cottonseed meal, 65 parts by volume of cornsteep liquor, 50 parts of dextrose, 0.3 parts by volume of 6 N HCl, and 1000 parts by volume of water. The inoculated medium is incubated for 36 hours with vigorous agitation and then 0.1 parts of 15(S)-hydroxy - 9 - oxo - 5 - cis - 10,13 - trans-prostatrienoic acid ($PGA_2$) in 10 parts by volume of acetone is introduced to the growing culture. Incubation is continued for an additional 24 hours and the product, 15(S)-hydroxy - 9 - oxo - 5 - cis - 13 - trans-prostadienoic acid, is isolated as described in Example 1.

Example 8

A culture of polyporus versicolor (NRRL 5610) is grown, exactly as described in Example 1, in a sterilized medium consisting of 150 parts of cottonseed meal, 65 parts by volume of cornsteep liquor, 50 parts of dextrose, 0.3 parts by volume of 6 N HCl, and 1000 parts by volume of water. The inoculated medium is incubated for 36 hours with vigorous agitation and then 0.1 part of 15(S)-hydroxy-9-oxo-5-cis-10,13-trans-prostatrienoic acid ($PGA_2$) in 10 parts by volume of acetone is introduced to the growing culture. Incubation is continued for an additional 24 hours and the product, 15(S)-hydroxy-9-oxo-5-cis-13-trans-prostadienoic acid, is isolated as described in Example 1.

Example 9

A culture of Sphaeropsis sp. (NRRL 5611) is grown, exactly as described in Example 1, in a sterilized medium consisting of 150 parts of cottonseed meal, 65 parts by volume of cornsteep liquor, 50 parts of dextrose, 0.3 parts by volume of 6N HCl, and 1000 parts by volume of water. The inoculated medium is incubated for 36 hours with vigorous agitation and then 0.1 part of 15(S)-hydroxy-9-oxo-5-cis - 10,13 - trans - prostatrienoic acid ($PGA_2$) in 10 parts by volume of acetone is introduced to the growing culture. Incubation is continued for an additional 24 hours and the product, 15(S)-hydroxy-9-oxo-5-cis-13-trans-prostadienoic acid, is isolated as described in Example 1.

Example 10

A culture of Stemphylium sp. (NRRL 5612) is grown, exactly as described in Example 1, in a sterilized medium consisting of 150 parts of cottonseed meal, 65 parts by volume of cornsteep liquor, 50 parts of dextrose, 0.3 parts by volume of 6N HCl, and 1000 parts by volume of water. The inoculated medium is incubated for 36 hours with vigorous agitation and then 0.1 parts of 15(S)-hydroxy-9-oxo-5 - cis - 10,13 - trans - prostatrienoic acid ($PGA_2$) in 10 parts by volume of acetone is introduced to the growing culture. Incubation is continued for an additional 24 hours and the product, 15(S)-hydroxy-9-oxo-5-cis-13-trans-prostadienoic acid, is isolated as described in Example 1.

Example 11

A culture of Stemphylium sp. (NRRL 5613) is grown, exactly as described in Example 1, in a sterilized medium consisting of 150 parts of cottonseed meal, 65 parts by volume of cornsteep liquor, 50 parts of dextrose, 13 parts by volume of 6 N HCl, and 1000 parts by volume of water. The inoculated medium is incubated for 36 hours with vigorous agitation and then 0.1 parts of 15(S)-hydroxy-9-oxo - 5 - cis - 10,13-trans-prostatrienoic acid ($PGA_2$) in 10 parts by volume of acetone is introduced to the growing culture. Incubation is continued for an additional 24 hours and the product, 15(S)-hydroxy-9- oxo-5-cis-13-trans-prostadienoic acid, is isolated as described in Example 1.

Example 12

A culture of *Cladosporium sp.* (NRRL 5600) is grown, exactly as described in Example 1, in a sterilized medium consisting of 150 parts of cottonseed meal, 65 parts by volume of cornsteep liquor, 50 parts of dextrose, 0.3 parts by volume of 6 N HCl, and 1000 parts by volume of water. The inoculated medium is incubated for 36 hours with vigorous agitation and then 0.1 part of 15(S)-hydroxy-9-oxo - 5 - cis - 10,13 - trans-prostatrienoic acid (PGA$_2$) in 10 parts by volume of acetone is introduced to the growing culture. Incubation is continued for an additional 24 hours and the product, 15(S)-hydroxy-9-oxo-5-cis-13-trans-prostadienoic acid, is isolated as described in Example 1.

Example 13

A culture of Hormodendrum sp. (NRRL 5606) is grown, exactly as described in Example 1, in a sterilized medium consisting of 150 parts of cottonseed meal, 65 parts by volume of cornsteep liquor, 50 parts of dextrose, 0.3 parts by volume of 6 N HCl, and 1000 parts by volume of water. The inoculated medium is incubated for 36 hours with vigorous agitation and then 0.1 parts of 15(S) - hydroxy - 9 - oxo-5-cis-10,13-trans-prostatrienoic acid (PGA$_2$) in 10 parts by volume of acetone is introduced to the growing culture. Incubation is continued for an additional 24 hours and the product, 15(S)-hydroxy-9 - oxo - 5 - cis - 13 - trans - prostadienoic acid, is isolated as described in Example 1.

Example 14

A culture of Epicoccum sp. (NRRL 4602) is grown, exactly as described in Example 1, in a sterilized medium consisting of 150 parts of cottonseed meal, 65 parts by volume of cornsteep liquor, 50 parts of dextrose, 0.3 parts by volume of 6 N HCl, and 1000 parts by volume of water. The inoculated medium is incubated for 36 hours with vigorous agitation and then 0.1 parts of 15(S)-hydroxy - 9 - oxo - 5 - cis - 10,13 - trans-prostatrienoic acid (PGA$_2$) in 10 parts by volume of acetone is introduced to the growing culture. Incubation is continued for an additional 24 hours and the product, 15(S)-hydroxy-9 - oxo - 5 - cis - 13 - trans-prostadienoic acid, is isolated as described in Example 1.

Example 15

A culture of Fusarium sp. (NRRL 5603) is grown, exactly as described in Example 1, in a sterilized medium consisting of 150 parts of cottonseed meal, 65 parts by volume of cornsteep liquor, 50 parts of dextrose, 0.3 parts by volume of 6 N HCl, and 1000 parts by volume of water. The inoculated medium is incubated for 36 hours with vigorous agitation and then 0.1 part of 15(S)-hydroxy-9-oxo - 5 - cis - 10,13 - trans-prostatrienoic acid (PGA$_2$) in 10 parts by volume of acetone is introduced to the growing culture. Incubation is continued for an additional 24 hours and the product, 15(S)-hydroxy-oxo-5-cis - 13 - trans - prostadienoic acid, is isolated as described in Example 1.

Example 16

A culture of Cephalosporium sp. (NRRL 5499) is grown, exactly as described in Example 1, in a sterilized medium consisting of 150 parts of cottonseed meal, 65 parts by volume of cornsteep liquor, 50 parts of dextrose, 0.3 parts by volume of 6 N HCl, and 1000 parts by volume of water. The inoculated medium is incubated for 36 hours with vigorous agitation and then 0.1 parts of 15(S)-hydroxy-9-oxo-5-cis-10,13 - trans-prostatrienoic acid (PGA$_2$) in 10 parts by volume of acetone is introduced to the growing culture. Incubation is continued for an additional 24 hours and the product, 15(S)-hydroxy-9-oxo - 5 - cis - 13 - trans - prostadienoic acid, is isolated as described in Example 1.

Example 17

A culture of Aspergillus sp. (NRRL 5497) is grown, exactly as described in Example 1, in a sterilized medium consisting of 150 parts of cottonseed meal, 65 parts by volume of cornsteep liquor, 50 parts of dextrose, 0.3 part by volume of 6 N HCl, and 1000 parts by volume of water. The inoculated medium is incubated for 36 hours with vigorous agitation and then 0.1 part of 15(S)-hydroxy-9-oxo-5-cis-10,13-trans-prostatrienoic acid (PGA$_2$) in 10 parts by volume of acetone is introduced to the growing culture. Incubation is continued for an additional 24 hours and the product, 15(S)-hydroxy-9-oxo-5-cis-13-trans-prostadienoic acid, is isolated as described in Example 1.

Example 18

A culture of *Aspergillus niger* (ATCC9642) is grown, exactly as described in Example 1, in a sterilized medium consisting of 150 parts of cottonseed meal, 65 parts by volume of cornsteep liquor, 50 parts of dextrose, 0.3 part by volume of 6 N HCl, and 1000 parts by volume of water. The inoculated medium is incubated for 36 hours with vigorous agitation and then 0.1 part of 15(S)-hydroxy-9-oxo-5-cis - 10,13 - trans-prostatrienoic acid (PGA$_2$) in 10 parts by volume of acetone is introduced to the growing culture. Incubation is continued for an additional 24 hours and the product, 15(S)-hydroxy-9-oxo-5-cis-13-trans-prostadienoic acid, is isolated as described in Example 1.

Example 19

A culture of *Aspergillus niger* (NRRL 330) is grown, exactly as described in Example 1, in a sterilized medium consisting of 150 parts of cottonseed meal, 65 parts by volume of cornsteep liquor, 50 parts of dextrose, 0.3 part by volume of 6 N HCl, and 1000 parts by volume of water. The inoculated medium is incubated for 36 hours with vigorous agitation and then 0.1 part of 15(S)-hydroxy-9-oxo-5-cis-10,13-trans-prostatrienoic acid (PGA$_2$) in 10 parts by volume of acetone is introduced to the growing culture. Incubation is continued for an additional 24 hours and the product, 15(S)-hydroxy-9-oxo-5-cis-13-trans-prostadienoic acid, is isolated as described in Example 1.

Example 20

A culture of *Aspergillus tamarii* (NRRL 5498) is grown, exactly as described in Example 1, in a sterilized medium consisting of 150 parts of cottonseed meal, 65 parts by volume of cornsteep liquor, 50 parts of dextrose, 0.3 part by volume of 6 N HCl, and 1000 parts by volume of water. The inoculated medium is incubated for 36 hours with vigorous agitation and then 0.1 part of 15(S)-hydroxy-9-oxo-5 - cis-trans-prostatrienoic acid (PGA$_2$) in 10 parts by volume of acetone is introduced to the growing culture. Incubation is continued for an additional 24 hours and the product, 15(S)-hydroxy-9-oxo-5-cis-13-trans-prostadienoic acid, is isolated as described in Example 1.

Example 21

A culture of *Aspergillus flavus* (NRRL 482) is grown, exactly as described in Example 1, in a sterilized medium consisting of 150 parts of cottonseed meal, 65 parts by volume of cornsteep liquor, 50 parts of dextrose, 0.3 part by volume of 6 N HCl, and 1000 parts by volume of water. The inoculated medium is incubated for 36 hours with vigorous agitation and then 0.1 part of 15(S)-hydroxy-9-oxo-5 - cis-10,13-trans-prostatrienoic acid (PGA$_2$) in 10 parts by volume of acetone is introduced to the growing culture. Incubation is continued for an additional 24 hours and the product, 15(S)-hydroxy-9-oxo-5-cis-13-trans-prostadienoic acid, is isolated as described in Example 1.

Example 22

A culture of *Aspergillus oryzae* (NRRL 5496) is grown, exactly as described in Example 1, in a sterilized medium consisting of 150 parts of cottonssed meal, 65 parts by volume of cornsteep liquor, 50 parts of dextrose, 0.3 part by volume of 6 N HCl, and 1000 parts by volume of water. The inoculated medium is incubated for 36 hours with vigorous agitation and then 0.1 part of 15(S)-hydroxy-9-oxo-5-cis-10,13-trans-prostatrienoic acid (PGA$_2$) in 10 parts by volume of acetone is introduced to the growing culture. Incubation is continued for an additional 24 hours and the product, 15(S)-hydroxy-9-oxo-5-cis-13-trans-prostadienoic acid, is isolated as described in Example 1.

Example 23

A culture of *Aspergillus albicans* (NRRL 5495) is grown, exactly as described in Example 1, in a sterilized medium consisting of 150 parts of cottonseed meal, 65 parts by volume of cornsteep liquor, 50 parts of dextrose, 0.3 part by volume of 6 N HCl, and 1000 parts by volume of water. The inoculated medium is incubated for 36 hours with vigorous agitation and then 0.1 part of 15(S)-hydroxy-9-oxo-5-cis-10,13-trans-prostatrienoic acid (PGA$_2$) in 10 parts by volume of acetone is introduced to the growing culture. Incubation is continued for an additional 24 hours and the product, 15(S)-hydroxy-9-oxo-5-cis-13-trans-prostadienoic acid, is isolated as described in Example 1.

Example 24

A culture of *Penicillium sp.* (NRRL 5608) is grown, exactly as described in Example 1, in a sterilized medium consisting of 150 parts of cottonseed meal, 65 parts by volume of cornsteep liquir, 50 parts of dextrose, 0.3 part by volume of 6N HCl, and 1000 parts by volume of water. The inoculated medium is incubated for 36 hours with vigorous agitation and then 0.1 part of 15(S)-hydroxy-9-oxo-5-cis-10,13-trans-prostatrienoic acid (PGA$_2$) in 10 parts by volume of acetone is introduced to the growing culture. Incubation is continued for an additional 24 hours and the product, 15(S)-hydroxy-9-oxo-5-cis-13-trans-prostadienoic acid, is isolated as described in Example 1.

Example 25

A culture of *Penicillium sp.* (NRRL 5609) is grown, exactly as described in Example 1, in a sterilized medium consisting of 150 parts of cottonseed meal, 65 parts by volume of cornsteep liquor, 50 parts of dextrose, 0.3 parts by volume of 6N HCl, and 1000 parts by volume of water. The inoculated medium is incubated for 36 hours with vigorous agitation and then 0.1 parts of 15(S)-hydroxy-9-oxo-5-cis-10,13-trans-prostadienoic aicd (PGA$_2$) in 10 parts by volume of acetone is introduced to the growing culture. Incubation is continued for an additional 24 hours and the product, 15(S)-hydroxy-9-oxo-5-cis-13-trans-prostadienoic acid, is isolated as described in Example 1.

Example 26

A culture of *Bacillus polymyxa* (ATCC 12321) is grown, exactly as described in Example 2, in a sterilized medium consisting of 3 parts of beef extract, 5 parts of peptone, and 1000 parts by volume of water. The inoculated medium is incubated for 36 hours in a nitrogen atmosphere with vigorous agitation and then 0.1 parts of 15(S) - hydroxy - 9 - oxo - 5 - cis - 10,13 - trans - prostatrienoic acid (PGA$_2$) in 10 parts by volume of acetone is introduced to the growing culture. Incubation is continued for an additional 24 hours and the product, 15(S)-hydroxy-9-oxo-5-cis-13-trans-prostadienoic acid, is isolated as described in Example 2.

Example 27

A culture of *Enterobacter aerogenes* (ATCC 129) is is grown, exactly as described in Example 2, in a sterilized medium consisting of 3 parts of beef extract, 5 parts of peptone, and 1000 parts by volume of water. The inoculated medium is incubated for 36 hours in a nitrogen atmosphere with vigorous agitation and then 0.1 part of 15(S)-hydroxy-9-oxo-5-cis-10,13-trans-prostatrienoic acid (PGA$_2$) in 10 parts by volume of acetone is introduced to the growing culture. Incubation is continued for an additional 24 hours and the product, 15(S)-hydroxy-9-oxo-5-cis-13-trans-prostadienoic acid, is isolated as described in Example 2.

Example 28

A culture of *Escherichia coli* (ATCC 4352) is grown, exactly as described in Example 2, in a sterilized medium consisting of 3 parts of beef extract, 5 parts of peptone, and 1000 parts by volume of water. The inoculated medium is incubated for 36 hours in a nitrogen atmosphere with vigorous agitation and then 0.1 parts of 15(S)-hydroxy-9-oxo-5-cis-10,13-trans-prostatrienoic acid (PGA$_2$) in 10 parts by volume of acetone is introduced to the growing culture. Incubation is continued for an additional 24 hours and the product, 15(S)-hydroxy-9-oxo-5-cis-13-trans-prostadienoic acid, is isolated as described in Example 2.

Example 29

A culture of *Proteus vulgaris* (ATCC 13315) is grown, exactly as described in Example 2, in a sterilized medium consisting of 3 parts of beef extract, 5 parts of peptone, and 1000 parts by volume of water. The inoculated medium is incubated for 36 hours in a nitrogen atmosphere with vigorous agitation and then 0.1 parts of 15(S)-hydroxy-9-oxo-5-cis-10,13-trans-prostatrienoic acid (PGA$_2$) in 10 parts by volume of acetone is introduced to the growing culture. Incubation is continued for an additional 24 hours and the product, 15(S)-hydroxy-9-oxo-5-cis-13-trans-prostadienoic acid, is isolated as described in Example 2.

Example 30

A culture of *Enterobacter aerogenes* (ATCC 13049) is grown, exactly as described in Example 2, in a sterilized medium consisting of 3 parts of beef extract, 5 parts of peptone, and 1000 parts by volume of water. The inoculated medium is incubated for 36 hours in a nitrogen atmosphere with vigorous agitation and then 0.1 parts of 15(S)-hydroxy-9-oxo-5-cis-10,13-trans-prostatrienoic acid (PGA$_2$) in 10 parts by volume of acetone is introduced to the growing culture. Incubation is continued for an additional 24 hours and the product, 15(S)-hydroxy-9-oxo-5-cis-13-trans-prostadienoic acid, is isolated as described in Example 2.

What is claimed is:

1. A process for the reduction of the 10(11) carbon to carbon double bond of a 10(11) unsaturated prostaglandin which comprises subjecting the 10(11) unsaturated prostaglandin, in an aqueous nitrient medium, to the fermentative action of a microorganism selected from the group consisting of fungi of the genera: Mucor, Crepidotus, Poilyporus, Sphaeropis, Stemphylium, Cladosporium, Hormodendrum, Epicoccum, Fusarium, Gliocladium, Cephalosphorium, Asperigllus, Penicillium, Dactylium and Cunninghamella and bacteria of the genera Bacillus, Enterobacter, Escherichia and Proteus, then isolating the prostaglandin product.

2. As in claim 1, a process for the 10(11) double bond reduction and concurrent C–18 hydroxylation of PGA$_2$ which comprises subjection of PGA$_2$ to the fermentative action of *Cunninghamella blakesleeana* (ATCC 9245).

3. As in claim 1, a process for reduction of the 10(11 double bond, of PGA$_2$ with concurrent 13(14) double bond reduction and oxidation of the 15-hydroxyl to a 15- keto function which comprises subjecting PGA$_2$ to the fermentative action of *Dactylium dendroides* (NRRL 2575).

4. As in claim 1, a process for reduction of the 10(11) double bond of PGA$_2$ with concurrent reduction of the 13(14)-double bond, oxidation of the 15-hydroxyl to a 15-keto function, and formation of an 8(12) double bond which comprises subjecting PGA$_2$ to the fermentative action of *Dactylium dendroides* (NRRL 2575).

5. As in claim 1, a process for conversion of 15(S)-hydroxy-9-oxo-5-cis - 10,13 - trans-prostatrienoic acid to 15(S)-hydroxy-9-oxo-5-cis - 13 - trans-prostadienoic acid which comprises subjecting the former to the fermentative action of Mucor sp. (NRRL 5607).

6. As in claim 1, a process for conversion of 15(S)-hydroxy - 9 - oxo-5-cis-10,13-trans-prostatrienoic acid to 15(S)-hydroxy-9-oxo-5-cis - 13 - trans-prostadienoic acid which comprises subjecting the former to the fermentative action of Crepidotus sp. (NRRL 5901).

7. As in claim 1, a process for conversion of 15(S)-hydroxy-9-oxo-5-cis - 10,13 - trans-prostatrienoic acid to 15(S)-hydroxy - 9 - oxo-5-cis-13-trans-prostadienoic acid which comprises subjecting the former to the fermentative action of *Polyporus versicolor* (NRRL 5610).

8. As in claim 1, a process for conversion of 15(S)-hydroxy-9-oxo - 5 - cis-10,13-trans-prostatrienoic acid to 15(S)-hydroxy-9-oxo-5-cis - 13 - trans-prostadienoic acid which comprises subjecting the former to the fermentative action of Sphaeropsis sp. (NRRL 5611).

9. As in claim 1, a process for conversion of 15(S)-hydroxy - 9 - oxo-5-cis-10,13-trans-prostatrienoic acid to 15(S)-hydroxy-9-oxo-5-cis - 13 - trans-prostadienoic acid which comprises subjecting the former to the fermentative action of Stemphylium sp. (NRRL 5612).

10. As in claim 1, a process for conversion (15(S)-hydroxy - 9 - oxo-5-cis-10,13-trans-prostatrienoic acid to 15(S)-hydroxy-9-oxo-5-cis - 13 - trans-prostadienoic acid which comprises subjecting the former to the fermentative action of Stemphylium sp. (NRRL 5613).

11. As in claim 1, a process for conversion of 15(S)-hydroxy-9-oxo - 5 - cis-10,13-trans-prostatrienoic acid to 15(S)-hydroxy - 9 - oxo-5-cis-13-trans-prostadienoic acid which comprises subjecting the former to the fermentative action of Cladosporium sp. (NRRL 5600).

12. As in Claim 1, a process for conversion of 15(S)-hydroxy-9-oxo-5-cis - 10,13 - trans-prostatrienoic acid to 15(S)-hydroxy - 9 - oxo-5-cis-13-trans-prostadienoic acid which comprises subjecting the former to the fermentative action of Hormodendrum sp. (NRRL 5606).

13. As in claim 1, a process for conversion of 15(S)-hydroxy-9-oxo - 5 - cis-10,13-trans-prostatrienoic acid to 15(S)-hydroxy - 9 - oxo-5-cis-13-trans-prostadienoic acid which comprises subjecting the former to the fermentative action of Epicoccum sp. (NRRL 5602).

14. As in claim 1, a process for conversion of 15(S)-hydroxy-9-oxo - 5 - cis-10,13-trans-prostatrienoic acid to 15(S)-hydroxy - 9 - oxo-5-cis-13-trans-prostadienoic acid which comprises subjecting the former to the fermentative action of Fusarium sp. (NRRL 5603).

15. As in claim 1, a process for conversion of 15(S)-hydroxy-9-oxo - 5 - cis-10,13-trans-prostatrienoic acid to 15(S)-hydroxy-9-oxo - 5 - cis-13-trans-prostadienoic acid which comprises subjecting the former to the fermentative action of Cephalosporium sp. (NRRL 5499).

16. As in claim 1, a process for conversion of 15(S)-hydroxy-9-oxo-5-cis - 10,13 - trans-prostatrienoic acid to 15(S)-hydroxy-9-oxo-5-cis - 13 - trans-prostadienoic acid which comprises subjecting the former to the fermentative action of Aspergillus sp. (NRRL 5497).

17. As in claim 1, a process for conversion of 15(S)-hydroxy - 9 - oxo-5-cis-10,13-trans-prostatrienoic acid to 15(S)-hydroxy-9-oxo-5-cis - 13 - trans-prostadienoic acid which comprises subjecting the former to the fermentative action of *Aspergillus niger* (ATCC 9642).

18. As in claim 1, a process for conversion of 15(S)-hydroxy - 9 - oxo-5-cis-10,13-trans-prostatrienoic acid to 15(S)-hydroxy-9-oxo-5-cis - 13 - trans-prostadienoic acid which comprises subjecting the former to the fermentative action of *Aspergillus niger* (NRRL 330).

19. As in claim 1, a process for conversion of 15(S)-hydroxy - 9 - oxo-5-cis-10,13-trans-prostatrienoic acid to 15(S)-hydroxy - 9 - oxo-5-cis-13-trans-prostadienoic acid which comprises subjecting the former to the fermentative action of *Aspergillus tamarii* (NRRL 5498).

20. As in claim 1, a process for conversion of 15(S)-hydroxy - 9 - oxo-5-cis-10,13-trans-prostatrienoic acid to 15(S)-hydroxy - 9 - oxo-5-cis-13-trans-prostadienoic acid which comprises subjecting the former to the fermentative action of *Aspergillus flavus* (NRRL 482).

21. As in claim 1, a process for conversion of 15(S)-hydroxy-9-oxo - 5 - cis-10,13-trans-prostatrienoic acid to 15(S)-hydroxy - 9 - oxo-5-cis-13-trans-prostadienoic acid which comprises subjecting the former to the fermentative action of *Aspergillus oryzae* (NRRL 5496).

22. As in claim 1, a process for conversion of 15(S)-hydroxy - 9 - oxo-5-cis-10,13-trans-prostatrienoic acid to 15(S)-hydroxy - 9 - oxo-5-cis-13-trans-prostadienoic acid which comprises subjecting the former to the fermentative action of *Aspergillus albicans* (NRRL 5495).

23. As in claim 1, a process for conversion of 15(S)-hydroxy-9-oxo - 5 - cis-10,13-trans-prostatrienoic acid to 15(S)-hydroxy - 9 - oxo-5-cis-13-trans-prostadienoic acid which comprises subjecting the former to the fermentative action of Penicillium sp. (NRRL 5608).

24. As in claim 1, a process for conversion of 15(S)-hydroxy-9-oxo - 5 - cis-10,13-trans-prostatrienoic acid to 15(S)-hydroxy-9-oxo-5-cis - 13 - trans-prostadienoic acid which comprises subjecting the former to the fermentative action of Penicillium sp. (NRRL 5609).

25. As in claim 1, a process for conversion of 15(S)-hydroxy-9-oxo-5-cis - 10,13 - trans-prostatrienoic acid to 15(S)-hydroxy-9-oxo-5-cis - 13 - trans-prostadienoic acid which comprises subjecting the former to the fermentative action of *Bacillus polymyxa* (ATCC 12321).

26. As in claim 1, a process for conversion of 15(S)-hydroxy - 9 - oxo-5-cis-10,13-trans-prostatrienoic acid to 15(S)-hydroxy-9-oxo-5-cis - 13 - trans-prostadienoic acid which comprises subjecting the former to the fermentative action of *Enterobacter aerogenes* (ATCC 13049, ATCC 129).

27. As in claim 1, a process for conversion of 15(S)-hydroxy-9-oxo - 5 - cis-10,13-trans-prostatrienoic acid to 15(S)-hydroxy-9-oxo-5-cis - 13 - trans-prostadienoic acid which comprises subjecting the former to the fermentative action of *Escherichia coli* (ATCC 4352).

28. As in claim 1, a process for conversion of 15(S)-hydroxy - 9 - oxo-5-cis-10,13-trans-prostatrienoic acid to 15(S)-hydroxy - 9 - oxo-5-cis-13-trans-prostadienoic acid which comprises subjecting the former to the fermentative action of *Proteus vulgaris* (ATCC 13315).

References Cited
UNITED STATES PATENTS 3,687,811   8/1972   Colton et al. _____ 195—51 R ALVIN E. TANENHOLTZ, Primary Examiner U.S. Cl. X.R.

195—30; 260—514